(No Model.)

G. D. BURTON.
ANTI FRICTION BEARING.

No. 338,657. Patented Mar. 23, 1886.

WITNESSES
H. P. Bates
Jas. J. Maloney

INVENTOR
Geo. D. Burton

UNITED STATES PATENT OFFICE.

GEORGE D. BURTON, OF NEW IPSWICH, NEW HAMPSHIRE.

ANTI-FRICTION BEARING.

SPECIFICATION forming part of Letters Patent No. 338,657, dated March 23, 1886.

Application filed November 16, 1885. Serial No. 183,022. (No model.)

*To all whom it may concern:*

Be it known that I, GEORGE D. BURTON, of New Ipswich, county of Hillsborough, State of New Hampshire, have invented an Improvement in Anti-Friction Bearings, of which the following description, in connection with the accompanying drawings, is a specification, like letters on the drawings representing like parts.

My invention relating to an anti-friction bearing is shown embodied in a bearing for a tricycle where the revolving part or axle turns within a box which does not revolve, although it is obvious that a bearing of the same construction may be used where the outer part or box revolves, being, for instance, formed within the hub of the wheel, and the inner part or axle is stationary.

The invention is embodied in a bearing comprising an outer member or box having two circumferential grooves or rabbets, forming seats for the anti-friction devices, which may be cylindrical or slightly tapering rollers, and the inner member of the bearing comprises a shaft or axle having bushings, one or both of which may be moved longitudinally thereon, the outer surface of which forms the bearing for the series of the anti-friction devices, and is provided with a flange or collar, which holds in position a washer that confines the anti-friction devices in proper position in the box, preventing them from moving in the direction parallel with the axis of the bearing. A suitable locking device fastens the sleeve forming the inner member of the bearing after it has been properly adjusted, and prevents movement thereof parallel with the axis of the bearing until released by said locking device, to permit a readjustment to be made.

Figure 1:
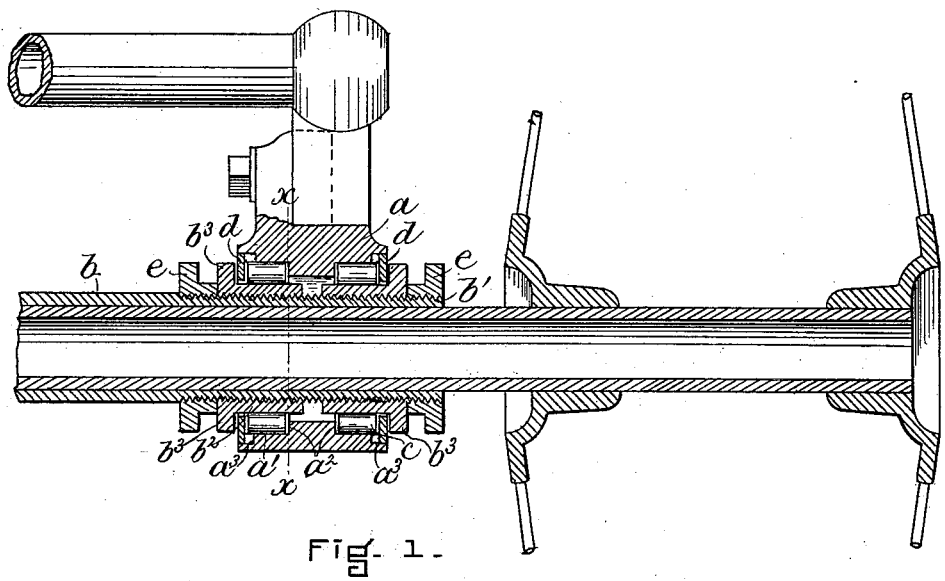
Figure 2:
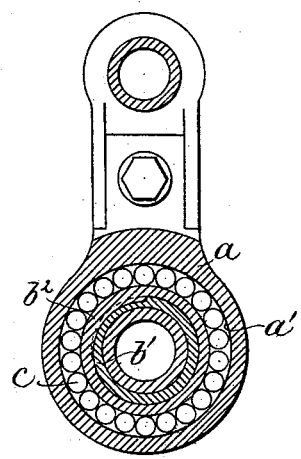
Figure 4:
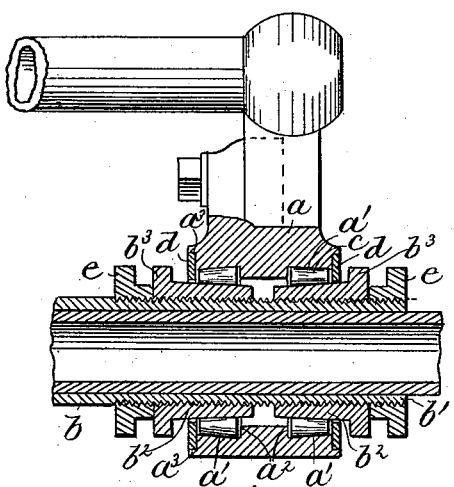
Figure 3:

Figure 1 is a longitudinal section of an anti-friction bearing embodying this invention, shown as applied to a revolving driving-axle and frame-work of a tricycle; Fig. 2, a vertical section thereof transverse to the axis of the bearing on line $xx$, Fig. 1; Fig. 3, a perspective view of one of the anti-friction rollers; Fig. 4, a longitudinal section of a bearing of similar construction, except that the anti-friction rollers are slightly tapering and the seats or surfaces on which they run are correspondingly tapered for the purpose of adjusting for wear; and Fig. 5, a perspective view of one of the tapering rollers.

The bearing consists of an outer member or box, $a$, the internal diameter of which is considerably larger than the external diameter of the shaft or axle $b$, which is to turn in it, or upon which the outer member may turn. The outer member or box, $a$, is provided at its ends with grooves or rabbets $a'$, the inner curved surfaces of which form a seat for a series of anti-friction devices, $c$, and the plane surface or shoulder $a^2$ at the inner end of which grooves serve to confine the said anti-friction devices or prevent them from moving toward the middle of the box in the direction parallel with the axis of the bearing. The inner member, $b$, of the bearing is shown as threaded at the part $b'$, which extends through the box $a$, and upon this threaded portion $b'$ are placed correspondingly-threaded bushings $b^2$, the outer surfaces of which receive the anti-friction devices $c$, the diameter of which is just equal to the space between the outer surface of the bushings $b^2$ and the inner surface of the groove $a'$ in the box $a$, so that there is no looseness or opportunity for one member of the bearing to move radially with relation to the other member.

In order to confine the anti-friction devices $c$ in proper position in the box or prevent them from moving outward from the middle of the box, the latter is counterbored for a short distance from its end, as shown at $a^3$, and provided with washers $d$, which fit the said counterbore, and are engaged by flanges or shoulders $b^3$ on the bearing-bushing $b^2$. The bushings $b^2$ may have a lengthwise movement on the inner member, $b$, by turning them upon the threaded portion $b'$, and they are thus turned until in their lengthwise movement the washer $d$ is brought close to the anti-friction devices $c$, so as to prevent movement or rattle of the latter, without, however, producing friction upon the ends thereof, and when the sleeves $b^2$ have been brought to the proper position they are fastened by locking devices $e$, (shown as check-nuts, also turning on the thread $b'$.)

Figure 5:
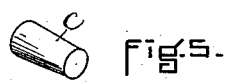

In a bearing of this kind the amount of wear between the anti-friction devices $c$ and the inner and outer surfaces co-operating with them is extremely small, so that a bearing of this kind will run for a great length of time without becoming loose or permitting movement of one member with relation to the other in a radial direction or transverse to the axis of rotation, so that it will not generally be necessary to provide for adjustment for wear in the radial direction. If, however, such adjustment should be desirable, the anti-friction devices $c$ may be made slightly tapering, as shown in Figs. 4 and 5, and the corresponding surfaces of the grooves $a'$ in the outer member or box, $a$, and outer surfaces of the bushings $b^2$ may be correspondingly tapered, so that by moving the bushings inward toward the middle of the bearing the tapering rollers $c$ will be forced outward until they come to a proper bearing between the bushing and box.

The washers $d$, besides confining the anti-friction devices, also serve to exclude the dust from the interior of the box, and thus protect the wearing-surfaces.

By having two independent series of rollers, as shown, one at either end of the box, a sufficient amount of surface is afforded to receive the pressure between the members of the bearing with less wear than if a single series of rollers each of greater length were provided.

I am aware that bearings have been made containing two rows of balls or spherical anti-friction devices co-operating with conoidal bearing-surfaces at opposite ends of an outer box and with correspondingly curved or conoidal bearing-surfaces on adjustable pieces connected with the inner member of the bearing, but in such bearings the wear is very great, owing to the fact that the weight is sustained practically on a single point of contact on opposite sides of the balls, and owing to the conoidal shape of the bearing-surfaces there is a wedging action tending to cause the balls to bind when the bearing is adjusted to hold the balls tightly, so that in a bearing of this kind when adjusted to run freely a disagreeable rattling sound will be produced, or if adjusted to prevent rattling noise the bearing will not run freely. These objections are overcome in the present invention by the use of rollers instead of balls, the said rollers having a bearing along their entire length which prevents undue wear, and having means to confine them against end motion, thus preventing rattling, and by the term "roller" an anti-friction device having a bearing along its entire length is meant, the said device being either cylindrical or slightly tapering or conical but not spherical.

I am aware that double-inclined ball-bearings tapering from the center toward the ends are old, and I therefore disclaim such construction.

I claim—

1. In an anti-friction bearing, the combination of the outer member or box having grooves or rabbets in either end terminating in shoulders, with the inner member and bushings provided with flanges, and the oblong anti-friction rollers interposed between the outer curved surface of said bushings and inner curved surface of the box and confined between the shoulder in the box and the flange on the bushing, substantially as described.

2. The combination of the outer member or box provided with grooves at either end with an inner member having a threaded portion extended through the box, flanged bushings supported on the said threaded portion, and check-nuts by which the said bushings are fastened when adjusted to the proper position, and the elongated frictional rollers, substantially as described.

3. The combination of the outer member or box provided with grooves at its ends and the inner member provided with bushings longitudinally adjustable thereon, and straight-sided tapering oblong anti-friction rollers between said bushing and box, which have their curved bearing-surfaces tapering to facilitate the adjustment of the rollers to compensate for wear and to co-operate with the said rollers, substantially as described.

4. The outer member or box grooved or rabbeted at its ends and having a counterbore of larger diameter at the outer end of the said groove, combined with the inner member and bearing bushings thereon, the elongated rollers placed in the grooves of the box and bearing on the said bushings, and washers in the counterbored part of the box, substantially as described.

In testimony whereof I have signed my name to this specification in the presence of two subscribing witnesses.

GEO. D. BURTON.

Witnesses:
    JOS. P. LIVERMORE,
    JAS. J. MALONEY.